United States Patent
Chaudhry et al.

(10) Patent No.: US 7,958,932 B2
(45) Date of Patent: Jun. 14, 2011

(54) CASTING MATERIALS

(75) Inventors: Anil R. Chaudhry, Xenia, OH (US);
Robert Dzugan, Cincinnati, OH (US);
Richard M. Harrington, Cincinnati, OH (US); Faurice D. Neece, Lyndurst, OH (US); Nipendra P. Singh, Pepper Pike, OH (US)

(73) Assignee: Fopat LLC, Dayton, OH (US)

( * ) Notice: Subject to any disclaimer, the term of this patent is extended or adjusted under 35 U.S.C. 154(b) by 426 days.

(21) Appl. No.: 12/167,546

(22) Filed: Jul. 3, 2008

(65) Prior Publication Data

US 2009/0008058 A1 Jan. 8, 2009

Related U.S. Application Data

(60) Provisional application No. 60/947,941, filed on Jul. 3, 2007.

(51) Int. Cl.
*B22C 7/02* (2006.01)
*B22C 9/04* (2006.01)
(52) U.S. Cl. ............ 164/516; 164/34; 164/45; 164/235
(58) Field of Classification Search .................. 164/516, 164/34, 45, 235
See application file for complete search history.

(56) References Cited

U.S. PATENT DOCUMENTS

| | | | |
|---|---|---|---|
| 3,747,663 A | 7/1973 | Taylor | |
| 4,240,492 A | 12/1980 | Edwards et al. | |
| 4,397,247 A * | 8/1983 | Lemelson | 108/57.1 |
| 4,660,623 A | 4/1987 | Ashton | |
| 4,877,078 A | 10/1989 | Wittmoser | |
| 4,982,781 A | 1/1991 | Carpenter et al. | |
| 5,002,475 A * | 3/1991 | Graefe | 425/135 |
| 5,735,336 A | 4/1998 | Oti | |
| 6,481,490 B1 | 11/2002 | Vihtelic et al. | |
| 6,901,989 B1 * | 6/2005 | Sargent et al. | 164/34 |
| 2004/0087754 A1 * | 5/2004 | Foley et al. | 528/59 |

* cited by examiner

*Primary Examiner* — Kuang Lin
(74) *Attorney, Agent, or Firm* — Thomas E. Lees, LLC

(57) ABSTRACT

A foam material comprises a liquid polymer and a liquid isocyanate which is mixed to make a solution that is poured, injected or otherwise deposited into a corresponding mold. A reaction from the mixture of the liquid polymer and liquid isocyanate inside the mold forms a thermally collapsible foam structure having a shape that corresponds to the inside surface configuration of the mold and a skin that is continuous and unbroken. Once the reaction is complete, the foam pattern is removed from the mold and may be used as a pattern in any number of conventional casting processes.

19 Claims, 6 Drawing Sheets

Test Block Dimensional Analysis

CASTING MATERIALS

CROSS REFERENCE TO RELATED APPLICATIONS

This application claims the benefit of U.S. Provisional Patent Application Ser. No. 60/947,941, filed Jul. 3, 2007, the disclosure of which is hereby incorporated by reference.

STATEMENT REGARDING FEDERALLY SPONSORED RESEARCH OR DEVELOPMENT

This invention was made with government support under Contracts No. FA8650-05-M-5304 and No. FA8650-06-C-5300 awarded by U.S. Air Force and Contract No. DE-FC36-04GO14332 awarded by the Department of Energy. The Government has certain rights in this invention.

BACKGROUND OF THE INVENTION

The present invention relates to casting processes for the manufacture metal and alloy structures, and more particularly, to systems, methods and materials associated with casting using fugitive patterns.

Investment casting, which is also commonly known as the lost wax process, is one of the oldest known techniques utilized for forming metal. In practice, a wax substance is patterned, such as by injecting melted wax into a die. When the wax cools, it solidifies in a pattern that corresponds to the component to be cast in metal. The molded wax pattern then is invested in a ceramic shell mold, such as by repeatedly dipping the wax pattern in a ceramic slurry until a desired thickness of ceramic material is built-up on the wax pattern. The shell mold is initially heated to remove the molded wax pattern and is then fired at an elevated temperature to develop appropriate mold strength for casting a molten metal or alloy.

There are several major limitations and potential problems with using wax to manufacture investment castings, especially when it comes to certain components, such as highly complex castings, large castings and/or castings with relatively thin cross-sections. For example, the dimensional accuracy of a part manufactured using a conventional investment casting process is limited due to the inherent distortion of the pattern that occurs in the processing of wax. Moreover, wax must be handled at room temperature or lower to prevent undesired wax characteristics and/or defects, such as shape distortion, fingerprints, creep, etc. Still further, conventional wax costs are relatively high due to the requirement of initial melt cycle(s) necessary to melt the wax prior to injecting the wax into a corresponding die. Cost is further increased due to the relatively high scrap rates, which typically results due to metal leakage from shell mold cracks caused by wax expansion and due to defects that lead to inclusions in the molten metal caused by ash content from wax reacting with the shell material.

Although investment casting techniques have existed for thousands of years, attempts to find suitable alternatives to wax have been largely unsuccessful. For example, attempts to form fugitive patterns from polystyrene or polyurethane foam have not been successful in high volume commercial investment casting operations, due for example, to problems with pattern surface quality, pattern material strength, cycle time and difficulty in removal of the pattern from the corresponding shell mold.

BRIEF SUMMARY OF THE INVENTION

According to an aspect of the present invention, a pattern for use in making a shell mold for casting operations comprises a thermally collapsible polyurethane foam pattern having a shape corresponding to the casting to be made. The resulting pattern may have an aggregate pattern density in the range of about 3 to 20 lbs/ft$^3$ (pounds per cubic feet) and may typically realize an aggregate density in the range of 4 to 8 lbs/ft$^3$, although other density ranges may be utilized depending upon the specific application. Despite the relatively low density, the foam pattern exhibits sufficient stiffness, rigidity and smooth surface characteristics to be invested in a shell mold without damage to the pattern. Moreover, the dimensional stability of the resulting pattern enables the pattern to be stored for extended periods of time and shipped or otherwise transported using commercial means.

The foam material comprises a liquid polymer (polyol) and a liquid isocyanate which is mixed, e.g., at a high velocity, with one or more additives, e.g., a reaction agent, skin forming agent, etc., to make a solution that is poured, injected or otherwise deposited into a corresponding mold. A reaction from the mixture of the polyol and isocyanate inside the mold forms a foam structure having a shape that corresponds to the inside surface configuration of the mold cavity. Once the reaction is complete, e.g., typically within a few minutes, the foam pattern is removed from the mold. The pattern is then used by a foundry to dip into a ceramic slurry to form a casting mold around the foam pattern. The skin/surface of the foam pattern should preferably be continuous, unbroken, etc., so that no amount of water/ceramic slurry can penetrate the pattern surface, which could lead to shell cracking or other defects in the cast metal or metal alloy components in future processes using the shell mold. Once a sufficient thickness of ceramic material is built up on the foam pattern, the shell mold is heated to burn out the foam pattern. The formulation and density of the foam pattern is configured so that the shell mold does not crack during the removal of the foam pattern. Moreover, the foam pattern material burns out cleanly, leaving no significant ash residue in the shell mold which can contaminate the molten metal or alloy which is poured in the shell to make the casting during subsequent processing.

According to various aspects of the present invention, a method of forming a foam pattern for casting comprises heating a polyol component to a predetermined temperature and heating an isocyanate component to a predetermined temperature. The method further comprises mixing the polyol component and the isocyanate component to form a liquid mixture, adding a reaction agent to the mixture that accelerates the reaction of the polyol component and the isocyanate component and adding a skin forming agent to the mixture. The method still further comprises coating a mold cavity of a mold with a heat activated release agent, inserting the mixture into the mold cavity of the mold for a predetermined time sufficient for a reaction from the mixture of the polyol component and the isocyanate component to form a foam pattern structure and controlling the temperature of the mold to achieve a foam pattern.

The method still further comprises removing the foam pattern from the mold cavity and applying a coating over at least a portion of the foam pattern surface after removing the foam pattern from the molding to ensure the coated surface is sealed and water tight. The resulting foam pattern comprises a shape that corresponds to the inside surface configuration of the mold cavity, a structure comprising an aggregate pattern density less than 10 pounds per cubic foot and an outer surface that is free of porosity.

According to further aspects of the present invention, a method of forming a foam pattern for casting comprises identifying predetermined foam pattern characteristics, determining a polyol component formulation based upon the predetermined foam pattern characteristics, determining an isocyanate component formulation based upon the predetermined foam pattern characteristics and determining at least one additive component formulation based upon the predetermined foam pattern characteristics to affect at least one of reaction rate, cycle time, and pattern density processing.

The method further comprises controlling a reaction injection molding process to create the foam pattern by controlling the temperature of a polyol component that is prepared according to the polyol component formulation and controlling the temperature of an isocyanate component that is prepared according to the isocyanate component formulation. Still further, the reaction injection molding process is controlled by controlling the mix rate of the polyol component, the isocyanate component and at least one additive component to form a mixture, applying a release agent to a mold cavity of a mold, inserting the mixture into the mold cavity of the mold controlling the temperature of the mold and controlling the cycle time of processing to achieve a resulting thermally collapsible foam pattern within the cavity having a shape that corresponds to the inside surface configuration of the mold cavity and a structure comprising an outer surface that is free of porosity and an aggregate pattern density less than 10 pounds per cubic foot.

Still further, the method comprises allowing the foam pattern to cool to room temperature and spraying the foam pattern with a spray to seal the foam pattern so as to be water tight.

DETAILED DESCRIPTION OF THE INVENTION

In the following detailed description, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of the present invention.

The present invention provides systems, methods and materials associated with casting using fugitive patterns, such as for casting of metals or alloys.

According to an aspect of the present invention, a pattern for use in making a shell mold comprises a thermosetting polyurethane foam material specifically formulated for investment casting applications that is shaped to correspond to the cast article or component to be made. The foam material pattern may be shaped using any number of molding techniques as will be described in greater detail below. As an example, the foam pattern may be constructed using a reaction injected molded (RIM) process.

Figure 1:
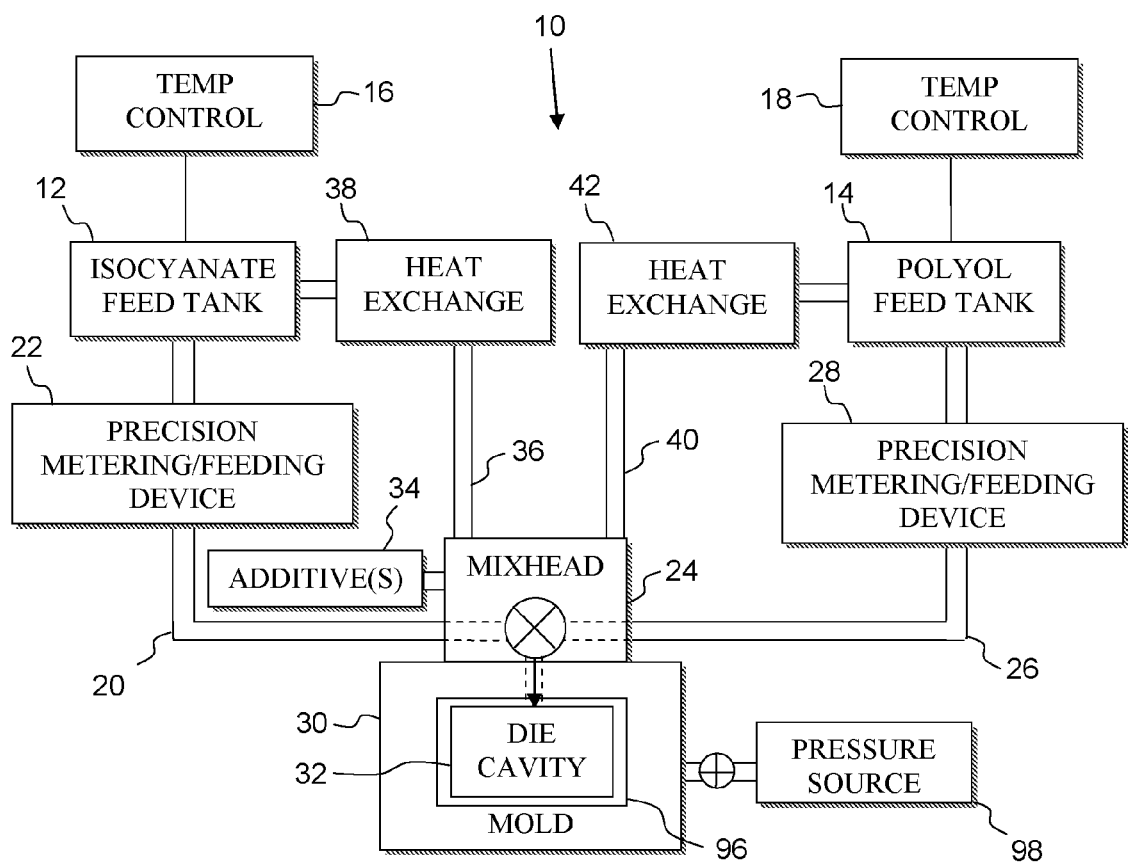
FIG. 1 is a block diagram of a reaction injection molding system to make foam patterns according to an aspect of the present invention.

Foam Pattern Constructed Using a Reaction Injected Molded Process:

Referring to FIG. 1, in a Reaction Injected Molded (RIM) process 10 according to various aspects of the present invention, an isocyanate component is maintained in liquid form in an isocyanate feed tank 12. Similarly, a polyol component is maintained in liquid form in a polyol feed tank 14. The isocyanate feed tank 12 and the polyol feed tank 14 are each temperature controlled, e.g. by a suitable temperature control device 16, 18 respectively.

A first supply line 20 carries a liquid isocyanate from the isocyanate feed tank 12 to a first precision metering/feeding device 22 that meters the isocyanate to a mixhead device 24. The first precision metering/feeding device 22 may comprise for example, a recirculation pump for controlling or otherwise assisting with the flow pressure of isocyanate. Similarly, a second supply line 26 carries liquid polyol from the polyol feed tank 14 to a second precision metering/feeding device 28 that meters the polyol to the mixhead device 24. The second precision metering/feeding device 28 may similarly comprise for example, a recirculation pump for controlling or otherwise assisting with the flow pressure of the polyol. The isocyanate and polyol enter a chamber within the mixhead 24 at high pressure where they are mixed before being injected into a corresponding mold 30 having die cavity 32 shaped to correspond to the desired pattern shape. The mixture may further comprise other additives 34 that are mixed with the polyol component and isocyanate component, such as a reaction agent, skin forming agent and/or other components that will be described in greater detail herein.

Once inside the mold 30, the mixed isocyanate and polyol undergo an exothermic chemical reaction that forms a molded polyurethane foam pattern within the die cavity 32 of the mold 30. A first return line 36 returns unused isocyanate from the mixhead 24 to the isocyanate feed tank 12, e.g., through a first heat exchanger 38 and/or other suitable devices such as an air nucleator (not shown). Similarly, a second return line 40 returns unused polyol from the mixhead 24 to the polyol feed tank 14, e.g., through a second heat exchanger 42 and/or other conventional RIM devices.

According to various aspects of the present invention, the polyol is water-based and is not solvent based as is typically used in conventional RIM formulations. The water based formulation does not create volatile organic compounds. An exemplary RIM machine for implementing the system shown in FIG. 1 comprises a model PureShot 30 from Hi-Tech Engineering of Grand Rapids Mich., U.S.A.

The molded polyurethane foam pattern is removed from the RIM mold 30. For example, the mold 30 may comprise complimentary mold halves that can be separated sufficient to eject the molded polyurethane foam pattern, e.g., by opening the mold halves and ejecting the pattern, e.g., using knockout pins or other suitable techniques. The pattern is typically allowed to cool, e.g., to room temperature, after removal from the RIM mold 30 prior to shell molding operations that are used in subsequent casting operations as described in greater detail herein. The molded pattern does not typically require cleaning prior to the shell mold operations. However, the foam pattern may be cleaned if desired using a conventional pattern wash, which may include a diluted citric acid in water solvent or diluted mineral spirits in a solvent. The foam pattern may also be treated, e.g., to provide surface protection as will be described in greater detail herein.

The resulting molded foam pattern exhibits a film-like surface that is sufficiently smooth and continuous, e.g., free from surface-connected open pores of the polyurethane foam. Thus, the foam pattern is suitable for casting operations. The thickness of the outer surface of the foam pattern will likely depend upon processing conditions and the geometry of the corresponding pattern. However, the skin (outer surface) may be typically less than 0.001" thick.

Figure 2:
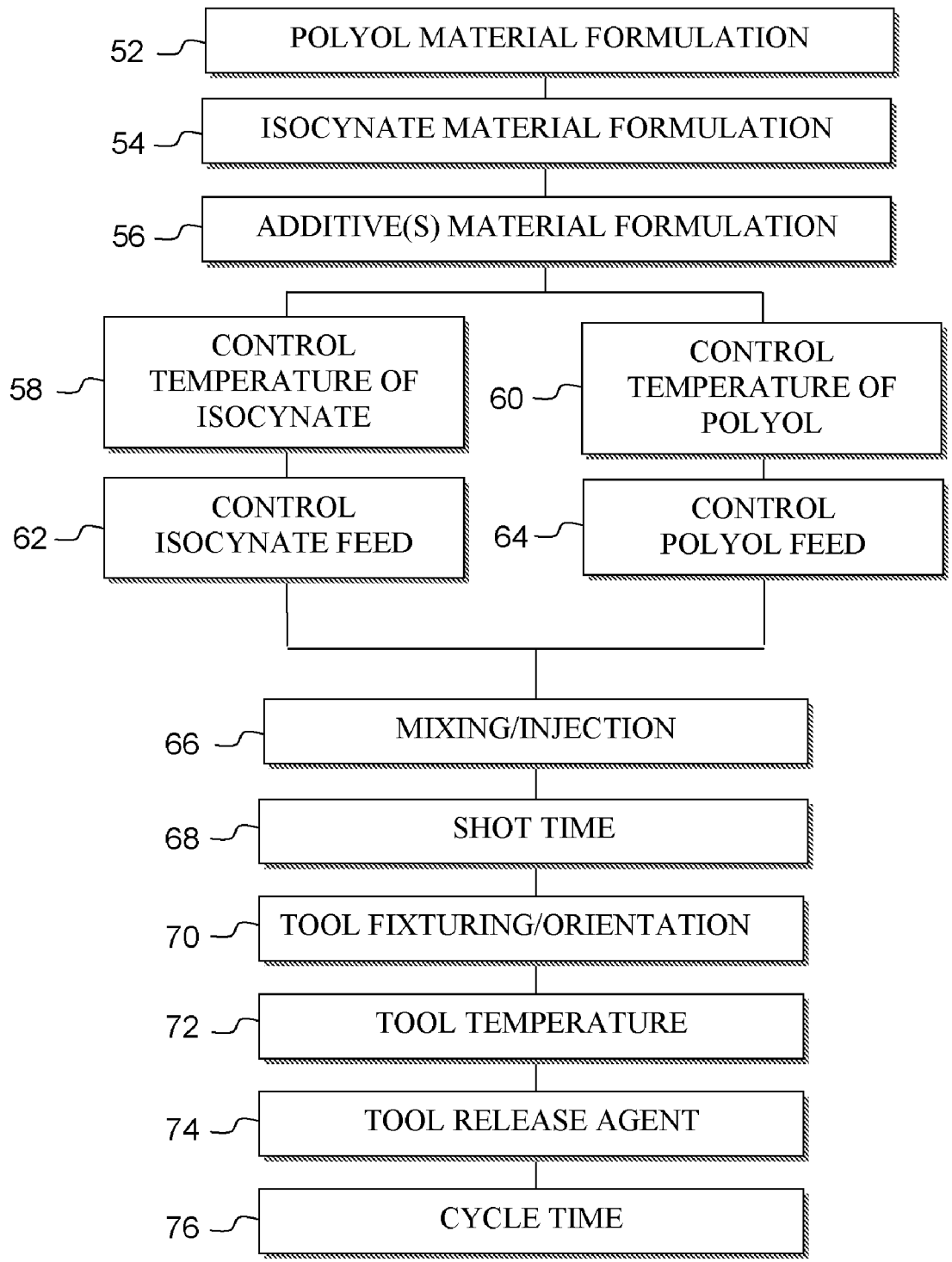
FIG. 2 is a block diagram of exemplary operational control parameters according to various aspects of the present invention.

In the exemplary RIM system shown in FIG. 1, numerous operating parameters and machine features can be controlled to achieve desired foam pattern characteristics. For example initially, foam pattern characteristics may be identified/defined. Referring to FIG. 2, a block diagram illustrates foam pattern design parameters that can be controlled to achieve the desired foam pattern characteristics according to various aspects of the present invention, e.g., using RIM processes. For example, as shown at 52, the polyol component formulation is determined/controlled, e.g., based upon the predetermined foam pattern characteristics. For example, a water based polyether polyol may be utilized. Alternatively, polyether polyols having different molecular weights may be combined to achieve desired results. Similarly, at 54, the isocyanate component formulation is determined/controlled e,g., based upon the predetermined foam pattern characteristics. For example, the isocyanate material may comprise a diisocyanate that is mixed as necessary to provide a desired isocyanate index. The polyol and isocyanate material formulations affect pattern formation and density and as such, the particular formulation may depend upon the desired foam pattern requirements, as noted above. Additionally, any necessary additive material formulations are determined at 56, which are to be added to the mixture, e.g., to control blowing reaction, cross-linking and gelling. Exemplary additive materials comprise, for example, accelerant(s), catalyst(s), blowing agent(s), skin-forming additive(s), chain extender(s), water, surfactant, tertiary amine catalyst(s) and amine catalyst(s), etc. Additive component formulations can be determined/controlled based upon the predetermined foam pattern characteristics such that their addition to the mixture affects, for example, reaction rates, cycle times, and the density of pattern.

In addition to determining the mixture material formulations, numerous process parameters may be controlled and adjusted to achieve desired foam pattern characteristics. For example, as shown at 58, the temperature of the isocyanate component (prepared according to the isocyanate component formulation) may be controlled. Similarly, at 60, the temperature of the polyol component (prepared according to the polyol component formulation) may be controlled. Temperature control of the polyol and isocyanate formulations affects reaction rates and cycle times. Additional process control parameters include the isocyanate feed at 62 and polyol feed at 64, which affect pour time or injection rates. Still further, process control parameters such as the mixing/injection characteristics at 66, which affects mixing rates and formation of solution of liquids and thus material consistency, and the shot or material injection time 68, i.e., the time utilized to inject the isocyanate and polyol into the mixhead can also be controlled. The shot time affects pattern density and surface characteristics. Still further, the tool fixturing/orientation may be controlled at 70, which affects pattern quality such as dimensions, surface and consistency. As such, the mix rate of the polyol component, the isocyanate component and at least one additive component is controlled to form a mixture, which may be inserted into the corresponding mold.

The tooling temperature may be controlled at 72, which affects pattern density and quality, and the tooling release agent may be selected/determined or otherwise controlled at 74, which affects pattern surface quality and manufacturability. Yet further, the cycle time, i.e., time needed for the mixture to fully react in the mold to form the foam pattern can be controlled at 76, which affects pattern manufacturability and pattern production cost. Where applicable, other design parameters may include tool design, tool venting, and other parameters which may be necessary to control to achieve desired foam pattern characteristics.

By way of illustration and not by way of limitation of some exemplary operating parameters according to various aspects of the present invention, the isocyanate and polyol may be injected into the mixhead at a pressure within the range of approximately 1,800 pounds per square inch (psi) to approximately 2,000 psi. Additionally, the flow rates of the isocyanate stream and polyol stream may be adjusted in an operating range of approximately 6 pounds per minute (lbs/min) to approximately 30 lbs/min. The mixture of material may be injected into the mold in a time range of approximately 0.2 seconds to approximately 3 seconds. Process time in the mold may be adjusted within a range of approximately 1 minute to approximately 6 minutes. Still further, the temperature of the isocyanate stream may range from approximately 85 degrees Fahrenheit (approximately 30 degrees Celsius) to approximately 110 degrees Fahrenheit (approximately 43 degrees Celsius). Similarly, the temperature of the polyol stream may range from approximately 85 degrees Fahrenheit (approximately 30 degrees Celsius) to approximately 110 degrees Fahrenheit (approximately 43 degrees Celsius).

Additionally, the temperature of the mold 30, e.g., the temperature of the mold halves may be controlled. As noted above, the mixture causes an exothermic reaction in the mold, which produces heat. However, controlled pre-heating of the mold can assist the reaction, e.g., to affect the formation of a suitable skin, to influence the overall density of the foam pattern, etc. As an illustrative example, the tooling, e.g., the mold cavity may be pre-heated to a range from approximately 100 degrees Fahrenheit (approximately 38 degrees Celsius) to approximately 140 degrees Fahrenheit (approximately 60 degrees Celsius) for molding operations to create the foam patterns. The above ranges are illustrative and other ranges may be utilized, e.g., based upon pattern dimensions and specific pattern requirements.

According to various aspects of the present invention, the surface finish of the mold 30, e.g., the surface finish of the mold halves and in particular, the surface of the die cavity 32, can be chosen to impart a desired finish to the outer surface of the foam pattern and thus may affect the surface finish of a corresponding shell mold and casting as part of the complete investment casting process. The surface finish of the mold 30 can thus be tailored to the desired surface finish of the casting to be made in a corresponding shell mold.

Figure 3:
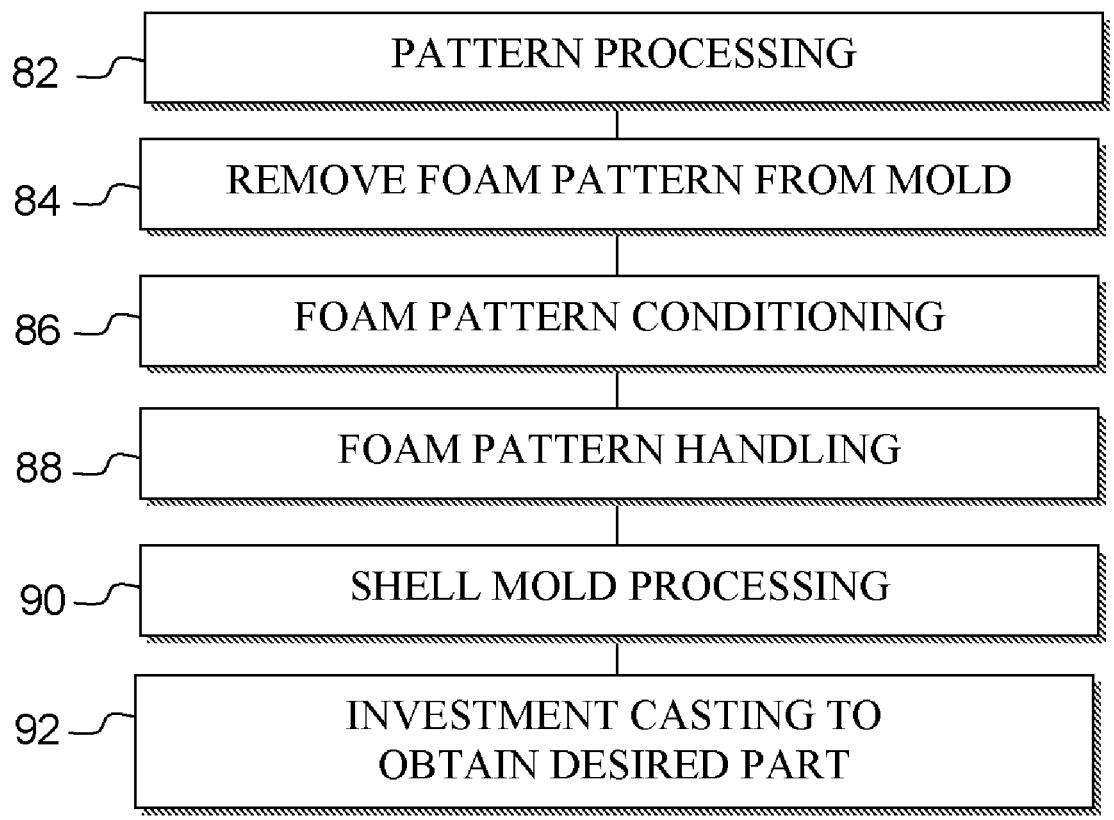
FIG. 3 is a flow chart illustrating an investment casting lifecycle according to various aspects of the present invention.

Referring to FIG. 3, according to various aspects of the present invention, a lifecycle 80 illustrates an overview of the investment casting process according to various aspects of the present invention. Initially, a foam pattern is created at 82. For example, the foam pattern may be created by heating a polyol component, e.g., a liquid polymer, to a predetermined temperature, heating an isocyanate component to a predetermined temperature and mixing the polyol component and the isocyanate component, e.g., at a high velocity, to form a liquid mixture. The method may further comprise adding a reaction agent to the mixture that accelerates the reaction of the polyol component and the isocyanate component and adding a skin forming agent to the mixture.

The foam pattern is further created by coating a mold cavity of a mold with a heat activated release agent, inserting the mixture into the mold cavity of the mold for a predetermined time sufficient for a reaction from the mixture of the polyol component and the isocyanate component to form a foam pattern structure having a shape that corresponds to the inside surface configuration of the mold cavity and controlling the temperature of the mold to achieve a foam pattern.

In this regard, the mixture may be inserted into the mold cavity by pouring as will be described in greater detail herein, by injecting, e.g., using the RIM molding process as set out in greater detail herein with reference to FIGS. 1 and 2, or otherwise depositing the mixture into the mold.

Once the reaction is complete, e.g., typically within a few minutes, the foam pattern is removed from the mold. The resulting foam pattern comprises a shape that corresponds to the inside surface configuration of the mold cavity and an outer surface that is free of porosity. The resulting pattern may have an aggregate pattern density in the range of about 3 to 20 lbs/ft$^3$ (pounds per cubic feet) and may typically realize an aggregate density in the range of 4 to 8 lbs/ft$^3$, although other density ranges may be utilized depending upon the specific application.

Once the foam pattern has been formed, it is removed from the mold at 84. The foam pattern may also be allowed to cool, e.g., to room temperature. Depending upon the application, it may be desirable to apply optional foam pattern conditioning at 86. As an illustrative example, it may be desirable to perform surface conditioning of the foam pattern, such as by spraying the surface of the foam pattern with a wax spray. The wax spray may be utilized to ensure the surface of the foam pattern is sealed and is water tight before the foam pattern is handled, e.g., before the foam pattern goes to a foundry for shell building and casting. As an illustrative example, according to aspects of the present invention, the foam pattern may comprise a thermally collapsible polyurethane foam pattern having a shape corresponding to the casting to be made.

Moreover, the foam pattern exhibits a pattern skin, i.e., the skin surrounding the low density foam pattern, which is continuous without being too thick. The pattern skin is controlled by controlling the pattern density, tool temperature, material temperature, etc., as set out in greater detail herein. According to various aspects of the present invention, the processing parameters discussed herein may be controlled to realize the lowest density rigid foam that would provide a suitable skin for the intended application.

The foam pattern is handled at 88. For example, as will be described in greater detail herein, the foam pattern created according to various aspects of the present invention is stable and thus may be readily transported and/or otherwise stored or handled before continuing the process. Keeping with the above-example, the dimensional stability of the resulting pattern enables the pattern to be stored for extended periods of time and shipped or otherwise transported using commercial means.

The foam pattern is utilized at a subsequent process for use in making a shell mold for casting operations at 90, e.g., by a foundry process that creates the corresponding molded parts. When the shell molding process completes, a shell mold is created that is suitable for investment casting to obtain a desired part at 92. Again, in furtherance of the above example, despite the relatively low density of the thermally collapsible polyurethane foam pattern, the foam pattern exhibits sufficient stiffness, rigidity and smooth surface characteristics to be invested in a shell mold without significant damage to the pattern.

As an illustrative example, the foam pattern created at 82 may be utilized by a foundry to dip into a ceramic slurry to form a casting mold around the foam pattern. The skin or surface of the foam pattern should be continuous, unbroken, etc., so that the water/ceramic slurry can not penetrate the pattern surface, thus avoiding fabrication problems such as shell cracking and/or preventing other defects in the cast metal or metal alloy components in future processes using the shell mold. Once a sufficient thickness of ceramic material is built up on the foam pattern, the shell mold is heated to burn out the foam pattern. The formulation and density of the foam pattern is configured so that the shell mold does not crack during the removal of the foam pattern. Moreover, the foam pattern material burns out cleanly, leaving no significant ash residue in the shell mold which can contaminate the molten metal or alloy which is poured in the shell to make the casting during subsequent processing.

According to various aspects of the present invention, the polyol material formulation, the isocyanate material formulation, optional additive(s) material formulation and the above-described process parameters are controlled so as to realize from the RIM process described with reference to FIGS. 1 and 2, a self-skinning, thermosetting rigid polyurethane foam pattern that is thermally collapsible. The density range of the foam pattern may be adjusted, e.g., using the operational parameters set out above, to achieve foam patterns that have good, e.g., continuous, consistent, unbroken skin (surface characteristics) with minimal material overall, i.e. low density. According to various aspects of the present invention, there may be a range of optimum density depending on the geometry, complexity, wall thickness, etc., of the resulting foam pattern. This range may comprise, for example, approximately 3 to 20 lbs/ft$^3$. Relatively higher density may be required, for example, for relatively thin walled pattern geometries and lower density may be utilized, for example, for most other foam pattern geometries that do not have a lot of thin walls.

The foam pattern according to various aspects of the present invention, provides stiffness and/or rigidity sufficient to be invested in a shell mold without damage to the pattern or mold and allows for the replication of complex features. In this regard, the foam pattern may be formulated, e.g., based upon manipulation of the above-described parameters, to have a sufficiently smooth continuous solid surface to avoid significant defects in the resulting cast metal or alloy components. As an example, the foam pattern volume may comprise 85-95% air and the remainder volume may comprise the polyurethane structurally rigid foam made up of an interconnected cellular structure. The skin/surface is smooth and may be less than 0.001" thick in some applications.

The mixture of isocyanate and polyol may include selected additives, e.g., which may be added to the polyol stream or are otherwise provided in the polyol composition. Additives may include, for example, accelerators, catalysts, etc., which accelerate the reaction of the isocyanate and polyol to the foam composition to reduce cycle times. Other exemplary additives may comprise skin-forming additives such as diamine, chain extenders to promote hard segment concentration in the pattern resulting in more rigid or stiff foam structure and water blowing agents to control free rise density of the foam pattern. In this regard, the free rise density comprises an exemplary parameter that may be configured for controlling pattern density.

Other additives may also be included in the mixture, depending for example, upon intended pattern characteristics. For example, as noted above, a catalyst may be added to the mixture of isocyanate and polyol to accelerate a foaming reaction, which may result in faster cycle times in production which lowers manufacturing costs and thus makes the production process more competitive and easier to commercialize.

The foam pattern constituents may also comprise materials similar to the polyurethane that is set out in U.S. Pat. No. 6,481,490, issued Nov. 19, 2002 to Vihtelic et al., which is hereby incorporated by reference in its entirety. In this regard, the constituents disclosed therein may be utilized in conjunction with various aspects of the present invention to manufacture foam patterns using the techniques, mixtures and operational parameters as set out in greater detail herein.

In general, molds capable of RIM processing are conventionally made of steel or aluminum due to the typical temperature requirements and processing conditions of wax molding. However, according to aspects of the present invention, e.g., as set out at box 70 in FIG. 2, tool fixturing may be a parameter that can be adjusted or varied depending upon the desired foam pattern to be realized. By controlling operating parameters and the selection of additives into the isocyanate stream, polyol stream or mixture thereof according to various aspects of the present invention as set out in greater detail herein, relatively cheaper mold cavities may be utilized, e.g., constructed from rubber, plastics, composites, etc.

Figure 4:
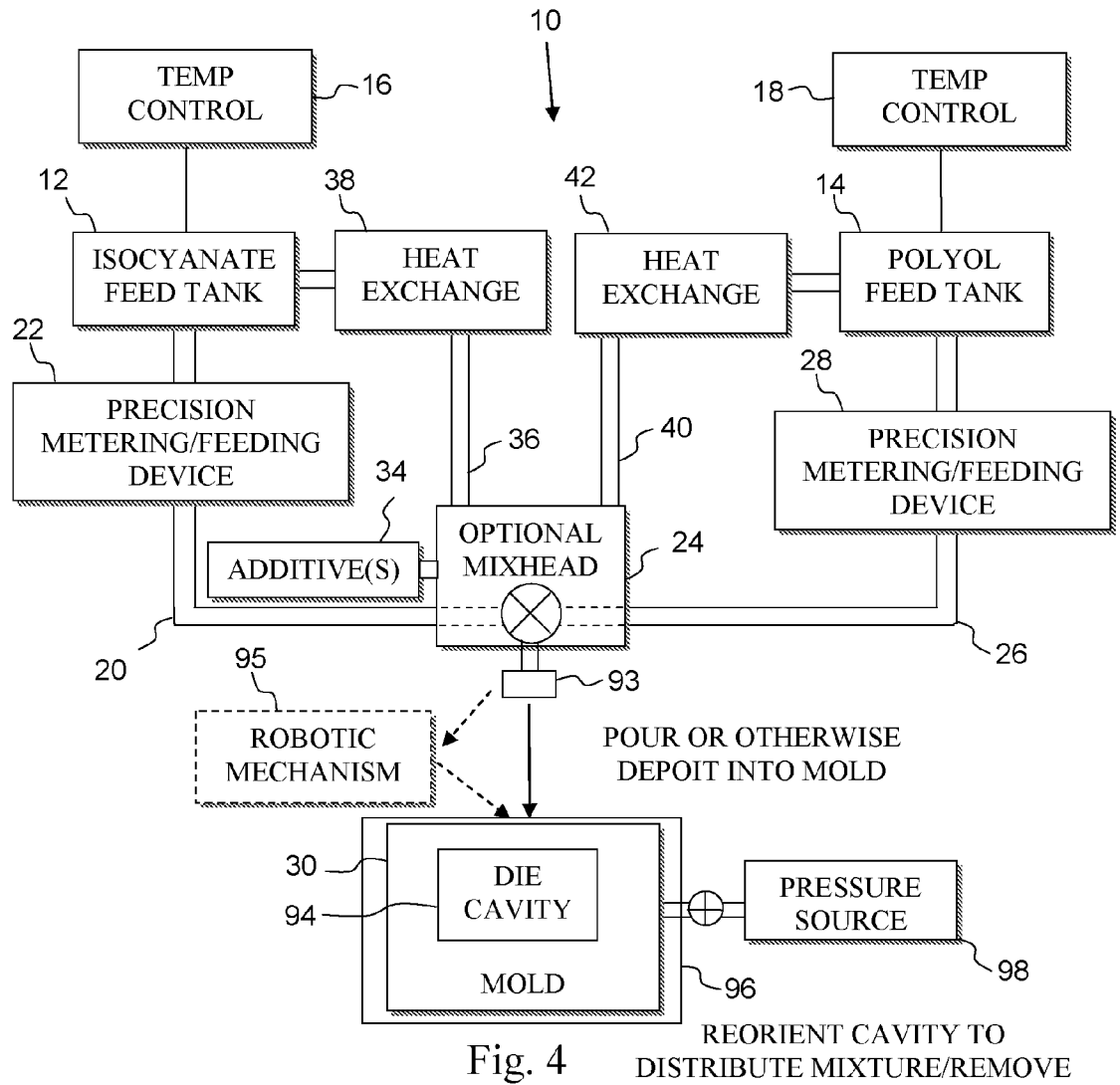
FIG. 4 is a block diagram of a reaction injection molding system to make foam patterns according to further aspects of the present invention.

Referring to FIG. 4, another RIM system is illustrated, which is similar to that described with reference to FIG. 1. As such, like structure is illustrated with like reference numerals. Moreover, the discussion of the system with reference to FIG. 1 applies to the system of FIG. 4 except where noted herein. According to various aspects of the present invention, the foam pattern composition described herein enables the use of numerous and flexible tool fixturing/configurations. As an illustrative example, there is no requirement to inject the foam pattern mixture into an aluminum or steel closed mold. Rather, the mixture from the mixhead 24 may be stored to a suitable storage 93, which facilitates the ability to pour the mixture by hand into a corresponding mold. As another example, the system may allow hand mixing of all or part of the constituents of the mixture in lieu of, or in cooperation with the mixhead 24. Still further, a robotic component may mix and/or pour the mixture into the mold, e.g., via a suitable robotic mechanism 95. Depending upon the application, such hand or robotically poured techniques may lower tooling cost, simplify processing and/or offer manufacturing flexibility. Thus, as an illustrative example, the foam pattern mixture according to various aspects of the present invention may be either poured or injected into low cost tooling, e.g., a rubber mold cavity.

As yet a further example of various aspects of the present invention, the foam pattern mixture described more fully herein enables the use of "open" molding techniques as an alternative to or in addition to the use of "closed" molding techniques. Thus, the mold 30 may comprise a mold cavity 94 that is open, closed or a hybrid of open and closed. Under this arrangement, the material can be poured, e.g., a pre-mixed foam material may be ported to open mold for open mold deposition. According to various aspects of the present invention the ability of the foam pattern material to be poured or injected into an open and/or closed mold allows tooling flexibility and further enables control of mold orientation, such as further set out at box 70 in FIG. 2.

For example, the mold 30 may be reoriented, e.g., adjusted/controlled, rotated or otherwise manipulated after/while inserting the mixture into the mold 30 and mold (die) cavity 32/94. Reorientation (manipulation) of the mold may be performed while the mixture is in a liquid form and/or during the reaction process (prior to said mixture forming a solid foam structure), such as by an optional structure 96. For example, the structure 96 may cause the mold cavity 94 to rotate, translate or otherwise move, e.g., along one or more axes so as to optimize pattern properties including the distribution of the mixture and thus the corresponding reacted foam pattern in the mold. As a result, the system can avoid trapping air in the mold cavity 94 that would otherwise adversely affect the characteristics of the foam pattern, etc. For example, the structure 96 may comprise a single or multi-axis gimbaling device or similar structure that allows the orientation of the mold or mold cavity to be manipulated, e.g., either manually or automatically. As such, mold manipulation during and after the pour and/or injection processes are facilitated. The resulting pattern finish of foam patterns using these techniques may thus be improved by including less surface voids or entrapped air bubbles.

Still further, an optional pressure source 98 may be used to improve operating efficiency and/or to facilitate foam pattern characteristics. In this regard, the pressure source may be either a positive pressure source or a negative pressure source. As an illustrative example, a vacuum assist may be utilized to evacuate air from the mold 30 to draw the air and the reaction gases out from the mold 30 during foam pattern forming operations, thus affecting surface finish, surface quality, and overall pattern properties. Accordingly, design capabilities can now include intricate features and dimensional control of complex geometries.

A wax mold release agent, such as urethane Parfilm may be applied to the injection (or pour) mold surfaces, e.g., the die mold cavity 32, 94 prior to molding the pattern to facilitate release of the foam pattern from the mold as an alternative to the typical silicone release agent. As an illustrative example, the release agent may exhibit a suitable operating range of approximately 100 degrees Fahrenheit (approximately 38 degrees Celsius) to approximately 140 degrees Fahrenheit (approximately 60 degrees Celsius). The heat activated wax-based release agent acts to release the foam pattern out of the mold easily and quickly upon application of a sufficient temperature to the mold cavity, while providing the corresponding foam pattern with a good surface skin which is compatible with the foundry shell building process described more fully herein. Moreover, the use of the wax mold release agent does not require changes to conventional wax pattern shell building process, which lowers barriers to commercialization. The foam pattern material according to various aspects of the present invention, thus eliminates the requirement for a chemical soluble core (e.g., leachable wax which is commonly used as a core to create a cavity within a wax pattern) which may be replaced with a lower melting wax to melt out of the foam pattern material to create a cavity or a core feature inside the pattern. As such, no chemical bath is required for the investment cast parts, such as would conventionally be utilized when making hollow parts, etc.

Thus, the foam patterns may be formed using open or closed mold systems as an alternative to/or in combination with RIM and other injection molded systems and techniques as set out above.

Exemplary Construction of a Shell Mold:

As noted in greater detail herein, the molded foam pattern may be invested in a ceramic or refractory shell mold. For example, the molded foam pattern may be dipped in a liquid ceramic or refractory slurry. The excess slurry is drained and a stuccoing operation is performed, e.g., by dipping the foam pattern in a fine-grained sand until a desired thickness of a shell mold is built-up on the pattern pursuant to the well known "lost wax" process principles. For example, up to eight layers or more may be applied to the foam pattern in this manner. Further, a shell mold face coat and back-up layers can be built up and varied using conventional techniques, e.g., depending upon the molten metal or alloy to be cast in the shell mold.

After the shell mold is formed to a desired green (non-fired) shell mold wall thickness, the foam pattern is burned out from the shell mold, e.g., by heating the shell mold in a suitable heating device such as an oven or furnace. As an example, a suitable temperature range comprises approximately 1800-2000 degrees Fahrenheit (approximately 982 to 1100 degrees Celsius) for a time period of approximately 1 to 3 hours. After the application of a sufficient temperature for a sufficient time, the foam pattern becomes fugitive and is burned out of the mold without significantly cracking or otherwise damaging the shell mold. Moreover, no significant ash or residue remains from the foam pattern. For example, the foam pattern may burn out without changing from polyurethane foam to a liquid (unlike wax which melts and expands) so as to avoid cracking the shell mold, with substantially no residue, e.g., burn out ash, left in the shell mold as a result of pattern decomposition.

Further, additional optional processing, such as subjecting the shell and foam pattern to an optional isostatic gas pressure treatment at elevated gas (e.g. air) pressure and temperature prior to the pattern burnout operation, or other suitable techniques may be employed.

Following removal of the foam pattern, the shell mold may be conventionally preheated or fired at elevated temperature suited to the particular ceramic or refractory used to fabricate the shell mold in order to develop adequate shell mold strength for casting of the molten metal or alloy therein.

Foam Pattern Characteristics:

According to various aspects of the present invention, a foam patterned material is provided which may be used as a substitute for wax in the lost wax process utilized to make investment cast parts. The foam pattern material comprises a multi-component foam which offers potential savings, e.g., in terms of energy, reduced cost of manufacturing etc., thus extending design capabilities of investment cast parts.

According to various aspects of the present invention, the foam pattern material exhibits minimal pattern dimensional changes during processing, resulting in a stable pattern compared to conventional lost wax alternatives. For example, foam patterns according to various aspects of the present invention may exhibit as much as approximately $1/20^{th}$ or less of the dimensional variability compared to conventional wax counterparts, e.g., based on mold versus pattern dimensions. In an exemplary foam pattern, the material did not show shrinkage as commonly seen in wax. The foam pattern did exhibit a slight expansion from 0.07% to 0.13%. A comparative wax pattern typically exhibits shrinkage of approximately 0.6% to 0.8%.

Further, because the foam patterned material exhibits little or no pattern variation, there is a reduced likelihood of shell cracking during the process of preparing the shell mold. Also, the rigid characteristics of the foam pattern results in a durable material that exhibits good handling and dimensional stability. This enables patterns to be created, and then shipped, stored or otherwise maintained for extended periods of time. Moreover, the dimensional stability exhibited by foam patterns according to various aspects of the present invention, and correspondingly, the ability to realize extended shelf life of such foam patterns are further facilitated by significantly increased durability and resistance to temperature and other environmental conditions, including dynamic conditions, which are associated with the storage, packaging, handling etc. of foam patterns. Comparatively, conventional wax patterns have a relatively short life and are easily damaged or deformed, e.g., via wax creep.

As such, patterns can be centrally produced and shipped to appropriate foundries. Thus, the foam patterns according to various aspects of the present invention facilitate pattern making, which may be outsourced as an alternative to requiring in-house pattern making. That is, buyers of castings are no longer required to have the foundry make the pattern and the casting. As such, a buyer may purchase foam patterns from a first source and ship them to one or more foundries of choice for shell molding and subsequent casting.

According to various aspects of the present invention the foam pattern material has a relatively lower density than previous lost wax or other polymer pattern materials. The lower density improves manufacturing cycle times and low pressure injection allows alternate tooling and materials to be used. For an example, the addition of activators and accelerants to the foam material allows the formation of a foam pattern having a low density, e.g., within the range of approximately 3 to 12 lbs/ft$^3$, resulting in a more robust pattern material at relatively quick cycle times and short injection times. Also, the foam pattern material provides relatively quicker pattern fabrication and lower cost tooling than that required for conventional lost wax processes, e.g., by enabling alternative molding techniques as described herein, e.g., pour molding, vacuum assist molding etc., as well as alternative tooling to be used compared with conventional techniques, e.g., rubber molds compared to conventional aluminum or steel molds.

Additionally, the foam patterns according to various aspects of the present invention, meet Environmental Protection Agency standards. For example, the fugitive pattern decomposition is environmentally friendly. Burn test results are as follows:

Gas Testing:

Tests conducted according to AITM 3.0005 show under the Flaming and Non-Flaming conditions gas levels well below the max accepted levels. The average concentration (in parts per million, ppm) of the following gas components of smoke did not exceed the limits listed in the table below:

Limiting values as specified in the ABD 00031

| | |
|---|---|
| Hydrogen Fluoride HF | 100 ppm vol |
| Hydrogen Chloride HCl | 150 ppm vol |
| Hydrogen Cyanide HCN | 150 ppm vol |
| Sulfur Dioxide SO2/H2S | 100 ppm vol |
| Nitrous Gases NO/NO | 100 ppm vol |
| Carbon Monoxide CO | 1000 ppm vol |

According to various aspects of the present invention, the relatively lower density of the foam pattern material can enable the use of the foam pattern for other casting technologies. For example, in the Antioch process, which is a subset of plaster molding, the foam material may be heated to a point of shriveling. When it becomes a gel it may be removed from the mold. This is an alternative to an investment casting, where the foam material is burned out of the pattern. Other exemplary casting processes that may benefit from the use of a foam pattern comprise the Shaw Process, investment casting, lost foam casting, plaster molding, sand casting and other casting processes.

According to additional aspects of the present invention the foam patterned material is readily reworked or retooled. For example if the surface of a foam pattern described herein is broken and the cells are exposed, the pattern may be repaired with wax or other suitable materials. As another example, a composite foam pattern may be formed by joining at least two foam patterns together. As an illustration, pieces of foam pattern material can be glued or otherwise connected together to make larger assemblies, etc.

Figure 5:
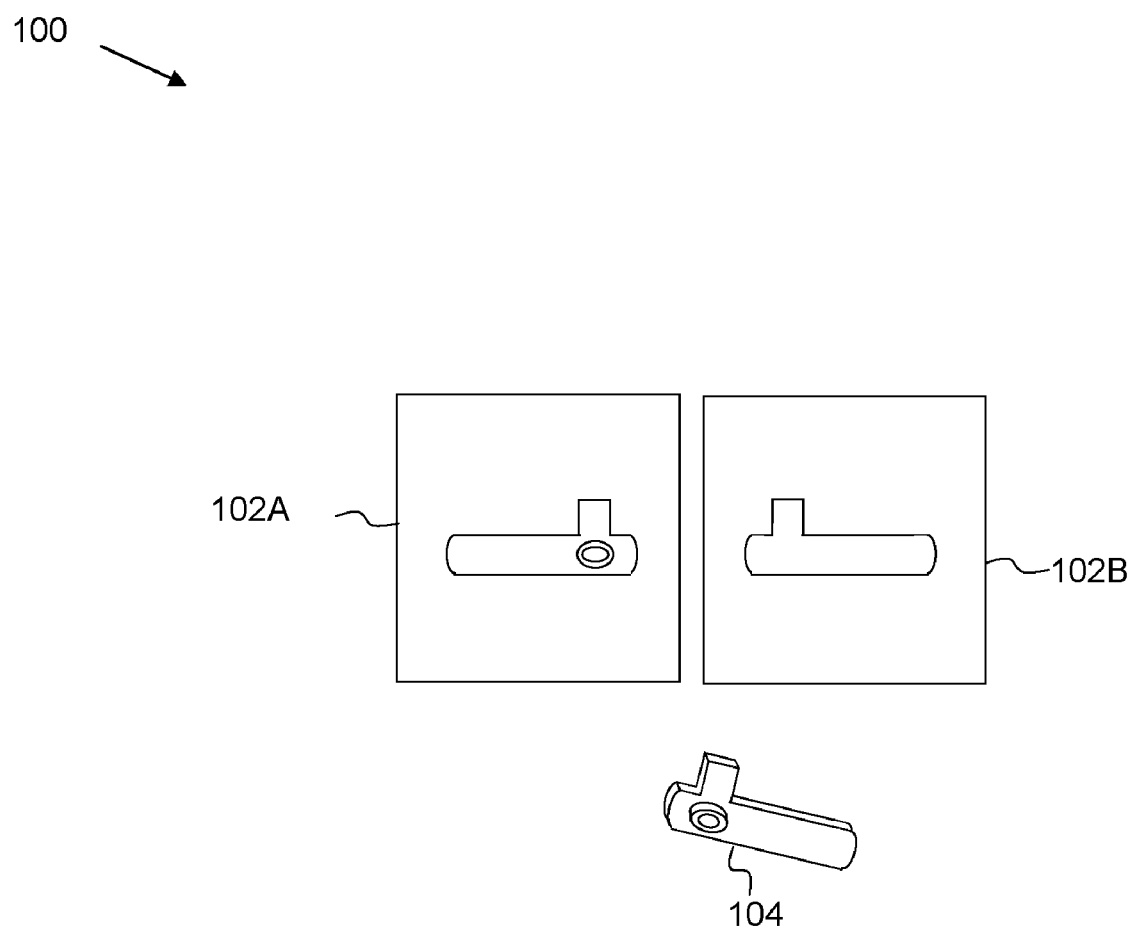
FIG. 5 is an illustration of a two-part mold cavity and a corresponding foam pattern made therein, according to various aspects of the present invention.

Referring to FIG. 5, an exemplary two-part mold 100 (also referred to as a die) is illustrated. The two part mold 100 comprises a first clamshell half 102A and a second clamshell half 102B. The first clamshell half 102A and second clamshell half 102B each have a die cavity that collectively corresponds to the shape of the desired three dimensional foam pattern 104 (shown as a complete, molded part). The second clamshell half 102B mates with the first clamshell half during molding operations, e.g., as part of the mold 30 shown in FIGS. 1 and 3, for example. Typical wax patterns having a small but thicker die usually require a chill prior to the injection process for proper wax injection patterning. This is done to minimize the "wax sink" that occurs when a heavy section of wax is cooling during solidification. However, the foam pattern 104 according to various aspects of the present invention set out in greater detail herein, eliminates adverse injection effects such as sink, thus eliminating the chill operation, making the resulting operation more efficient—providing for a better first time yield for dimensions and a less costly and less time consuming pattern injection compared to conventional wax processing.

According to aspects of the present invention, the foam pattern is also suitable for casting thin sections, e.g., as may be required by applications such as an airfoil. For example, a generic airfoil die may be constructed, e.g., in epoxy from a prior wax pattern, thus illustrating the versatility of the foam pattern process to easily inject long thin sections in less expensive epoxy dies compared to machined aluminum dies used in the current wax process. In an exemplary airfoil, the thinnest section of the airfoil is a 0.030" trailing edge and the main airfoil body only has a 0.100" thickness over a part that measures 8-9 inches in length.

Figure 6:
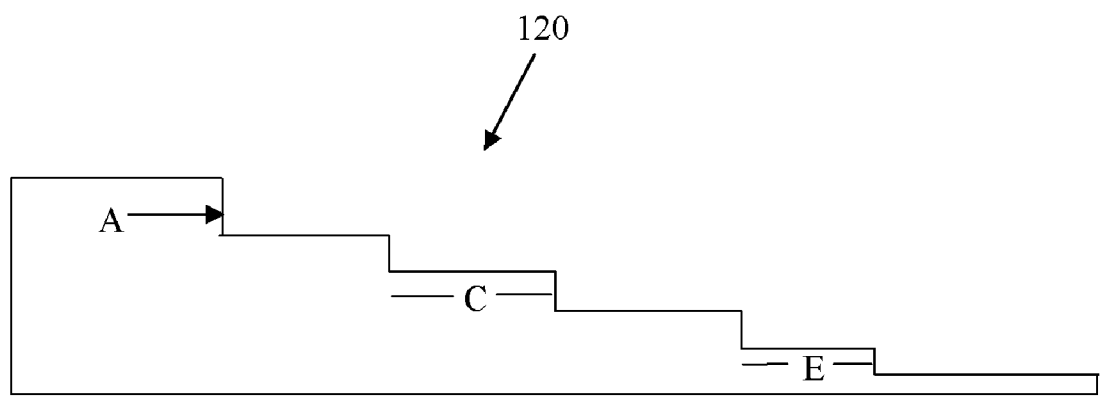
FIG. 6 is an illustration of a test block foam pattern to illustrate the dimensional stability of foam patterns created using techniques set out more fully herein.

Referring to FIG. 6, three test foam step blocks 120 were manufactured from a step block die (not shown), which has several different thickness sections or steps. The formation of the pattern ranges in thickness, e.g., from 1" down to 0.050" as shown in the table below. Measurements of the three samples made from the step block die are shown in Table 1 below:

Length—The length of a foam pattern test block pattern was measured at various points as shown at Points A, C, and E on the three injected pattern instances.

The dimensions were measured with a standard caliper and are shown as follows:

|  | Length in Inches | | | Total |
| --- | --- | --- | --- | --- |
|  | A | C | E | Length |
| DIE DIMENSIONS | 1.000 | 1.000 | 1.000 | 6.001 |
| Pattern #1 | 1.003 | 1.001 | 1.002 | 6.003 |
|  | 1.002 | 1.001 | 1.001 | 6.002 |
| Pattern #2 | 1.002 | 1.002 | 1.001 | 6.004 |
|  | 1.002 | 1.001 | 1.001 | 6.005 |
| Pattern #3 | 1.001 | 1.001 | 1.001 | 6.004 |
|  | 1.001 | 1.001 | 1.002 | 6.003 |
| Average of patterns | 1.002 | 1.001 | 1.001 | 6.003 |
| Variance vs Die | 0.2% | 0.1% | 0.1% | 0.03% |

Discussion of Results:

The tightness of the resulting foam patterns shows that the foam pattern material does not shrink into the die as wax does. The foam pattern material tested above exhibited a slight expansion of 0.1% to 0.2%, compared to wax, where the wax may exhibit a shrinkage, e.g., in a range of approximately 0.6% to 1.1%. Moreover, the slight expansion of the foam pattern material results in a smaller percentage of change from the actual die dimensions compared to wax. Thus, the foam patterns, e.g., as utilized in the exemplary tests, seem to display about one-fifth the variation of that observed in wax for similar size dimensions. This smaller dimensional change/variation allows for closer dimensional control of final castings and allow for designers to calculate weight on a tighter tolerance part, thereby saving weight in the parts cast. Even a tolerance that is 0.001 or 0.002 tighter may save many pounds over a large frame. Still further, air entrapment in conventional wax patterns and related defects on the surface of conventional wax patterns can result in significant problems including imprecision, waste, potentially defective part production, etc. Comparatively, the foam patterns according to various aspects of the present invention have a smooth skin and thus avoid the problems related to surface defects in conventional wax patterns, resulting in higher yield, less waste, improved quality control, etc.

According to various aspects of the present invention the foam pattern described in greater detail herein provides increased dimensional accuracy and increased temperature stability. For example, the foam patterned material exhibits insignificant pattern shrinkage which results in a stable pattern that can withstand significant temperatures, e.g., up to and potentially in excess of 200 degrees Fahrenheit (approxi-

TABLE 1

| All dimensions in inches | | | | | |
| --- | --- | --- | --- | --- | --- |
| Die | Dimension 1 | Dimension 2 | Dimension 3 | Dimension 4 | Dimension 5 |
| Step Block Die | 0.200/0.201 | 0.066/0.067 | 1.016/1.018 | 1.014/1.015 | 4.060/4.064 |
| Step Block Pattern #1 | 0.198/0.196 | — | 1.025/1.028 | 1.028/1.30 | 4.035/4.040 |
| Step Block Pattern # 2 |  | 0.68/0.69 | 1.025/1.026 | 1.025/1.026 | 4.103/4.105 |
| Step Block Pattern # 3 | 0.202/0.203 | 0.065/0.66 | 1.025/1025 | 1.026/1.028 | 4.104/4.106 | mately 93 degrees Celsius) without distortion. As such, the foam pattern according to various aspects of the present invention thus avoids potential problems otherwise realized with unstable waxes due to melting and solidification, shrinkage adjustments, wax expansion characteristics due to temperature, etc. The foam pattern materials according to the various aspects of the present invention also provide comparable or lower cost per pattern compared to conventional wax pattern materials.

The foam pattern also consumes less energy per pattern compared to conventional wax pattern processes. Correspondingly, less energy is required to produce foam patterns according to various aspects of the present invention as set out more fully herein, compared to conventional wax patterns. Moreover, due to the dimensional stability, light weight characteristic and robustness of the foam patterns set out herein, a significant shelf life may be realized. Still further, the foam patterns may be handled, stored etc., with significantly less risk of damage compared to conventional wax patterns. Moreover, due to the improved dimensional stability, the foam patterns yield tighter tolerances and less waste compared to conventional wax patterns. As such, energy conservation and cost savings are realized in not only the manufacture of the foam patterns themselves, but also in the handling of the patterns and in the investment casting process to obtain the desired produce.

Moreover, in addition to savings in terms of energy, foam patterns manufactured according to various aspects of the present invention as set out in greater detail herein, may realize overall cost savings to the manufacturer that can exceed 100% compared to conventional wax processes.

For example wax requires one or more melting cycles and a holding cycle at an elevated temperature such as 150 degrees Fahrenheit (approximately 66 degrees Celsius). However with the foam pattern, only minimal heating is required which is at near room temperature. Still further, the foam pattern according to various aspects of the present invention decreases the cost of pattern making equipment by reducing for example, the number of variables that must be controlled during the pattern making process (such as by eliminating the pre melt and melted wax hold cycles). Additionally, tooling costs are decrease with the foam pattern according to the various aspects of the present invention compared to wax patterns. For example, using traditional conventional wax patterns, a CNC machine is typically used to cut aluminum tooling and additional requirements are necessary to cool the pattern. However, using the foam pattern according to various aspects of the present invention, rubber, low cost plastic or composite molds/tooling may be used as an alternative to aluminum tooling. However, the foam patterns are compatible with conventional tooling as long as operational parameters are controlled as set out in greater detail herein.

As a few illustrative examples, ceramic cores may be used to create features such as cooling passages in the end casting of air foils. Moreover, foam mixtures according to various aspects of the present invention may be inserted, e.g., poured, injected, etc., into lower cost, quick tooling materials such as plastic or composite tools, including those made by rapid prototyping machines including Stereolithography (SLA), silicon rubber or Room Temperature Vulcanization (RTV) tooling. Moreover, Ren-Board machined tooling (a hard polymer tool cut in a CNC machine) may be utilized to create molds for forming foam patterns created from the foam mixtures described in greater detail herein.

Additionally, the foam pattern material increases the casting yield. For example wax dimensions change and wax can cause shell cracking defects. However the stability of the foam pattern according to various aspects of the present invention provides stable pattern dimensions and no shell cracking defects. As such, the traditional process of machining aluminum tooling, formulating the wax and providing as many as two or more melts cycles to prepare the wax, wax holding at or above a melt temperature and the injection of wax patterns into the machine and tooling can be reduced to the steps of building inexpensive tooling and then formulating and injecting the foam pattern with no significant heating requirements.

Example

For purposes of illustration and not limitation, the following Example is offered. A RIM polyurethane foam pattern comprising isocyanate, polyol and additives, e.g., as described with reference to FIGS. 1-4 above, was molded in a one step operation in a RIM mold to have a shape of a medical hip implant. The pattern was made using the RIM parameters of 1800 psi mix pressure, 30 lbs/min flow rate, a 0.2 second shot time and mold temperature of 130 degrees Fahrenheit (approximately 54 degrees Celsius). A mold release agent was used to facilitate the release of the foam pattern from the RIM mold. The molded pattern had an aggregate density of about 8 lbs/ft$^3$. The pattern was invested in a ceramic shell mold using "lost wax" process techniques such that the shell mold had a wall thickness generally up to 0.5 inches thick. The mold/pattern then was heated to 1900 degrees Fahrenheit (approximately 1038 degrees Celsius) in a furnace for a time of 120 minutes to burnout the pattern with zero ash present in the shell mold and without cracking the shell mold. The shell mold then was preheated up to 1900 degrees Fahrenheit (approximately 1038 degrees Celsius) for 120 minutes to prepare for casting of a molten cobalt alloy medical hip implant. A molten metal or alloy can be cast into the fired shell mold by any conventional casting technique to form one or more cast articles which have the shape of the fugitive pattern used to make the shell mold.

The flowchart and block diagrams in the Figures illustrate the architecture, functionality, and operation of possible implementations of systems and methods according to various embodiments of the present invention. In this regard, one or more blocks in the flowchart or block diagrams may represent a component, segment, etc., which comprises one or more logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the various aspects of the invention in detail and by reference to embodiments thereof, it will be apparent that modifications and variations are possible without departing from the scope of the invention defined in the appended claims.

What is claimed is:

1. A method of forming a foam pattern for casting comprising:
heating a polyol component to a predetermined temperature;
heating an isocyanate component to a predetermined temperature;
mixing said polyol component and said isocyanate component to form a liquid mixture;
adding a reaction agent to said mixture that accelerates the reaction of said polyol component and said isocyanate component;
adding a skin forming agent to said mixture;
coating a mold cavity of a mold with a heat activated release agent;
pouring said mixture into said mold cavity of said mold without direct injection by a reaction injection molding machine, such that a reaction from the mixture of said polyol component and said isocyanate component form a foam pattern structure having:
a shape that corresponds to the inside surface configuration of said mold cavity;
a structure comprising an aggregate pattern density of not more than 8 pounds per cubic foot; and
an outer surface that is free of porosity;
removing said foam pattern from said mold cavity; and
applying a coating over at least a portion of said foam pattern surface after removing said foam pattern from said molding to ensure the coated surface is sealed and water tight.

2. The method according to claim 1, wherein pouring said mixture into said mold cavity comprises:
using at least one of manually hand pouring or robotically pouring said liquid mixture of said isocyanate component and said polyol component into said mold.

3. The method according to claim 1, further comprising:
utilizing a pressure source coupled to said mold to affect at least one of surface finish, surface quality, and overall pattern properties.

4. The method according to claim 1, wherein utilizing a pressure source comprises utilizing a vacuum coupled to said mold.

5. The method according to claim 1, further comprising:
reorienting said mold cavity after pouring said mixture into the mold and prior to said mixture forming a solid foam structure so as to optimize pattern properties including the distribution of the mixture and thus the corresponding reacted foam pattern in said mold.

6. The method according to claim 1, wherein:
pouring said mixture into said mold cavity further comprises pouring said mixture into an open mold.

7. The method according to claim 1, further comprising:
providing said mold having said mold cavity tooled from at least one of a plastic, rubber or composite mold.

8. The method according to claim 1, further comprising:
utilizing a rapid prototyping machine to create said mold.

9. The method according to claim 1, further comprising:
forming a composite foam pattern suitable for shell mold processing by joining at least two foam patterns together.

10. A method of forming a foam pattern for casting comprising:
identifying predetermined foam pattern characteristics;
determining a polyol component formulation based upon said predetermined foam pattern characteristics;
determining an isocyanate component formulation based upon said predetermined foam pattern characteristics;
determining at least one additive component formulation based upon said predetermined foam pattern characteristics to affect at least one of reaction rate, cycle time, and pattern density processing;
controlling a process to create a mixture by:
controlling the temperature of a polyol component that is prepared according to said polyol component formulation;
controlling the temperature of an isocyanate component that is prepared according to said isocyanate component formulation; and
controlling the mix rate of said polyol component, said isocyanate component and at least one additive component to form a mixture;
applying a release agent to a mold cavity of a mold;
pouring said mixture into said mold cavity of said mold without reaction injection molding;
controlling the cycle time of processing to achieve a resulting thermally collapsible foam pattern within said cavity having a shape that corresponds to the inside surface configuration of said mold cavity and a structure comprising an outer surface that is free of porosity and an aggregate pattern density of not more than 8 pounds per cubic foot;
allowing said foam pattern to cool to room temperature; and
spraying said foam pattern with a spray to seal said foam pattern so as to be water tight.

11. The method according to claim 10, wherein determining a polyol component formulation comprises selecting said polyol component to comprise a water-based polyether polyol.

12. The method according to claim 10, wherein said foam pattern is controlled such that said outer surface of said structure comprises a smooth surface that is less than 0.001" thick.

13. The method according to claim 10, wherein:
controlling the temperature of a polyol component comprises controlling the temperature of said polyol component within the range of 30 degrees Celsius to 43 degrees Celsius;
controlling the temperature of an isocyanate component comprises controlling the temperature of said polyol component within the range of 30 degrees Celsius to 43 degrees Celsius;
controlling the mix rate comprises injecting said isocyanate material and said polyol material into a mixhead at a pressure within the range of 1,800 pounds per square inch (psi) to 2,000 psi;
controlling the temperature of said mold comprises controlling the temperature of said mold in a range from 38 degrees Celsius to 60 degrees Celsius; and
controlling the cycle time of processing comprises adjusting the processing time within said mold within a range of 1 minutes to 6 minutes.

14. The method according to claim 10, further comprising:
using said foam pattern to make a shell mold by:
performing a stuccoing operation until a desired thickness of a shell mold is built up on said foam pattern;
heating said shell mold so as to burn out said foam pattern from said shell mold in such a way that no ash residue remains in said shell mold that is sufficient to cause a component defect of either said shell mold or a part made thereby; and firing said shell mold at a desired temperature to develop adequate shell mold strength for casting.

15. The method according to claim 10, wherein:

determining at least one additive component formulation and said controlling a reaction injection molding process to create said foam pattern further comprise:

selecting additives into said mixture and controlling said reaction injection molding process to enable said foam pattern to be formed in a mold cavity constructed from at least one of rubber, plastics or composites.

16. The method according to claim 10, further comprising manipulating the orientation of said mold after pouring said mixture into said mold so as to eliminate adverse effects to the skin of said foam pattern due to air bubbles.

17. The method according to claim 10, further comprising drawing a vacuum in said mold to evacuate the air and the reaction gases out from said mold during foam pattern forming operations.

18. The method according to claim 10, further comprising:

reworking said foam pattern if cells of said foam pattern are detected as being exposed through said skin by applying a coating over said exposed cells.

19. The method according to claim 10, further comprising: utilizing a rapid prototyping machine to create said mold.

* * * * *